US008094757B2

(12) United States Patent
Qu

(10) Patent No.: US 8,094,757 B2
(45) Date of Patent: Jan. 10, 2012

(54) APPARATUS, AND ASSOCIATED METHOD, FOR DETECTING VALUES OF A SPACE-TIME BLOCK CODE USING SELECTIVE DECISION-FEEDBACK DETECTION

(75) Inventor: Shouxing Qu, Ottawa (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/899,280

(22) Filed: Oct. 6, 2010

(65) Prior Publication Data

US 2011/0019777 A1   Jan. 27, 2011

Related U.S. Application Data

(63) Continuation of application No. 11/749,874, filed on May 17, 2007, now Pat. No. 7,817,752.

(51) Int. Cl.
*H04L 27/06* (2006.01)

(52) U.S. Cl. ...................................... 375/340

(58) Field of Classification Search .................. 375/219, 375/240, 260, 265, 267, 299, 340, 341, 347, 375/243, 343, 345, 350; 370/206, 208, 240, 370/315, 335, 350, 210, 216
See application file for complete search history.

(56) References Cited

U.S. PATENT DOCUMENTS

| 6,192,067 | B1 * | 2/2001 | Toda et al. ................... 375/144 |
| 7,720,169 | B2 * | 5/2010 | Reuven et al. ................ 375/267 |
| 7,965,782 | B1 * | 6/2011 | Vijayan et al. ................ 375/262 |
| 2005/0018789 | A1 * | 1/2005 | Jia et al. ...................... 375/316 |
| 2005/0129107 | A1 * | 6/2005 | Park et al. .................... 375/233 |
| 2007/0129096 | A1 * | 6/2007 | Okumura et al. ............. 455/522 |
| 2007/0286313 | A1 * | 12/2007 | Nikopour-Deilami et al. ................ 375/341 |
| 2009/0028265 | A1 * | 1/2009 | Lee et al. ..................... 375/267 |

OTHER PUBLICATIONS

"Diversity and Multiplexing: a Fundamental Tradeoff in Multiple-Antenna Channels", L. Zheng and D.N.C. Tse, IEEE Transactions on Information Theory, vol. 49, No. 5, pp. 1073-1096, May 2003.
"Switching Between Diversity and Multiplexing in MIMO Systems", Robert W. Heath, JR. and Arogyaswami J. Paulraj, IEEE Transactions on Communications, vol. 53, No. 6, pp. 962-968, Jun. 2005.
"Detection Schemes for Space-Time Block Code and Spatial Multiplexing Combined Sytem", Lan Zhao, and V.K. Dubey, IEEE Communication Letters, vol. 9, No. 1, pp. 49-51, Jan. 2005.
"Low-Complexity Optimal Detection for Hybrid Space-Time Block Coding and Spatial Multiplexing", Yu Wu and Chintha Tellambura, IEEE 64-th Vehicular Technology Conference (VTC 2006-Fall), Montreal, Canada, Sep. 25-28, 2006.

(Continued)

*Primary Examiner* — David Payne
*Assistant Examiner* — Syed Haider

(57) ABSTRACT

A selective decision-feedback detector for the space-time block code which provides both diversity and spatial multiplexing. To detect a received code block of transmitted symbols, the channel matrix is properly preprocessed with the real and imaginary parts decoupled, and the selective decision-feedback detector makes multiple decisions on the same block upon differently permuted channel matrix and generates multiple candidates for the results. The indicators of the decision errors associated with the candidates are compared, and one of the candidates with the minimum error is selected by a selector as the decided symbols to be used for further processing at a receiving station.

20 Claims, 3 Drawing Sheets

OTHER PUBLICATIONS

"On Maximum-Likelihood Detection and the Search for the Closest Lattice Point", Mohamed Oussama Damen, Hesham El Gamal, and Giuseppe Caire, IEEE Transactions on Information Theory, vol. 49, No. 10, Oct. 2003.

"A Simple Transmit Diversity Technique for Wireless Communications", Siavash M. Alamouti, IEEE Journal on Select Areas in Communications, vol. 16, No. 8, Oct. 1998.

"Space-Time Coding", Branka Vucetic and Jinhong Yuan, John Wiley & Sons, Ltd., 2003.

"The Sorted-QR Chase Detector for Multiple-Input Multiple-Output Channels", Deric W. Waters and John R. Barry, IEEE Wireless Communications and Networking Conference, Mar. 13, 2005-Mar. 17, 2005, pp. 538-543, XP010791221.

* cited by examiner

APPARATUS, AND ASSOCIATED METHOD, FOR DETECTING VALUES OF A SPACE-TIME BLOCK CODE USING SELECTIVE DECISION-FEEDBACK DETECTION

CROSS REFERENCE TO RELATED APPLICATION

This application is a continuation of U.S. patent application Ser. No. 11/749,874, filed May 17, 2007, the content of which is incorporated herein by reference.

The present invention relates generally to a manner by which to recover the informational content of space-time block-coded data received at a communication station, such as a mobile station or network station of a radio communication system. More particularly, the present invention relates to apparatus, and an associated method, for detecting symbol values of the space-time block of data utilizing a selective decision-feedback detection technique.

Detection of the symbol values is made with an error performance that is close to optimal performance but uses significantly less computational complexity required of conventional detectors that utilize conventional detection techniques.

BACKGROUND OF THE INVENTION

Advancements in digital communication technologies have permitted the development and deployment of digital communication systems capable of communicating, and operating upon, large amounts of data. Data-intensive communication services, previously wholly unavailable or impracticably cost-prohibitive, are now available to large segments of the population. And, additional, even more, data-intensive communication services are likely to be provided in the future.

Digital radio communication systems are amongst the communication systems that have taken advantage of the advancements in digital communication techniques. A cellular radio communication system is an exemplary type of radio communication system. Use of a cellular communication system through which to communicate is pervasive in many parts of the populated areas of the world. While early-generation cellular communication systems were used primarily for voice communication services, new-generation systems are increasingly used for data-intensive, data communication services, such as multimedia communication services.

A cellular communication system is a bandwidth-constrained system. Other radio communication systems are typically also bandwidth-constrained. The radio-frequency bandwidth allocated to a cellular communication system is limited. And, due to the limited allocation, the communication capacity of the system is constrained. Significant efforts have been made to make efficient use of the bandwidth allocated for use in a cellular, or other bandwidth-constrained, communication system. And, as the communication channels upon which data is communicated are typically non-ideal, susceptible, e.g., to fading, noise, and other interference and distortion, significant efforts have also been made to compensate for, or otherwise overcome, the impairment introduced upon the data as a result of its communication upon non-ideal channels.

Recent research in wireless communications has proven that the channel capacity in fading environment can be greatly increased by exploiting the spatial diversity by using multiple transmit antennas, multiple receive antennas, or both multiple transmit and receive antennas. In communication systems with multiple antennas, the message-carrying data needs to be properly encoded in both spatial and temporal dimensions, resulting in the so-called space-time code (STC). Among many STC techniques, space-time block code (STBC) is one of the most popular one, in which the data are coded in blocks.

With increased channel capacity through STBC with multiple antennas, data can be transmitted with reduced error rate, or at an increased data rate, or with both improvements. However, decoding of the coded data with STBC requires increased computational complexity at a receiving communication station. In principle, the optimum error-rate performance is achievable by using maximum likelihood detection, however the computational complexity makes it impractical to use in reality in most applications. Spherical detection, such as that carried out by a sphere detector (SD) provides optimal detection with reduced computational complexity, but still requires significant computing complexity levels. The computational complexity required to recover the informational content of the data is particularly problematical when performed at a mobile station, or other communication station, that is of relatively low computational capability.

If a manner could be provided by which to make detection of a space-time block code requiring reduced computational complexity, the advantages provided by the use of a space-time block code would be provided without the corresponding disadvantages required of processing-intensive decoding techniques.

It is light of this background information related to the communication of data in a communication system that the significant improvements of the present invention have evolved.

DETAILED DESCRIPTION

Figure 1:
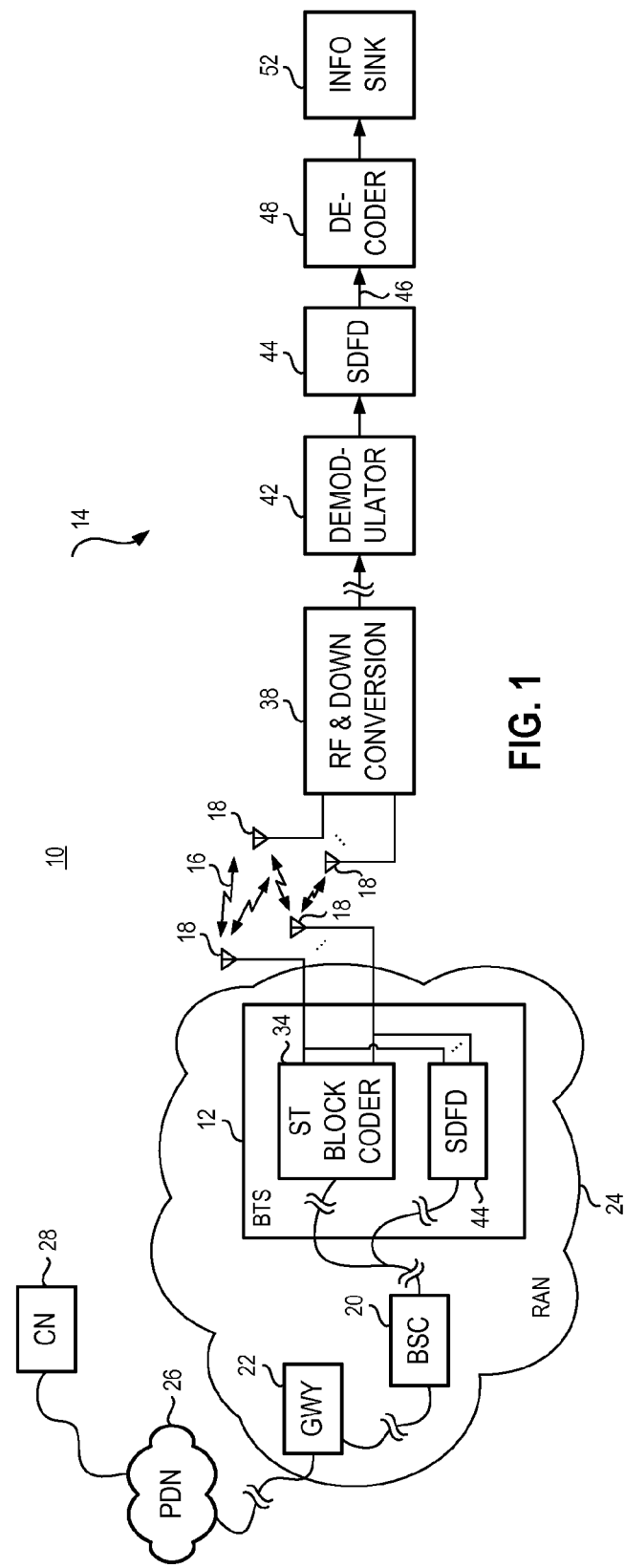
FIG. 1 illustrates a functional block diagram of a data communication system in which an embodiment of the present invention is operable.

The present invention, accordingly, advantageously provides apparatus, and an associated method, by which to recover the informational content of space-time block coded data received at a communication station, such as a mobile station, or network station, of a radio communication system.

Through operation of an embodiment of the present invention, a manner is provided for detecting symbol values of the blocks of data through use of a selective decision-feedback technique.

In one aspect of the present invention, detection of the symbol values is made with an error performance that is close to optimal but is requiring of significantly lessened levels of computational complexity than required of conventional techniques and detectors.

In another aspect of the present invention, a set of decision-feedback detectors each form decided values of the data symbols of the space time block code. Each of the decision-feedback detectors is provided with the same received indications of the space-time block code. Different ones of the decision-feedback detector elements, however, are provided with different characterizations of the channel characteristics upon which the space-time block code is transmitted. As different inputs are provided to the different decision-feedback detector elements, different detections, i.e., decided values, are formed by the separate elements.

In another aspect of the present invention, a channel matrix, once preprocessed, is provided to a first of the decision-feedback detector elements. And, a permutation of the channel matrix, once preprocessed, is provided to another of the decision-feedback detector elements. If more than two decision-feedback detector elements are utilized, additional permutations of the preprocessed channel matrix are provided to corresponding additional ones of the detector elements.

In another aspect of the present invention, each of the decision-feedback detector elements includes a soft-valued decision generator and a hard-valued decision generator. The soft-valued decision generator is provided with a combined representation of the received space-time block code and the channel matrix and makes soft decisions based, at least in part, thereon. And, the hard-valued decision generator makes hard decisions based upon the soft-valued decisions. A feedback path is provided that provides indications of hard-valued decisions made by the hard decision generator to the soft decision generator.

In another aspect of the present invention, each decision-feedback detector element includes an error calculator that operates pursuant to a mean-squared error operation or a simple error-sum (ES) operation. Such operations indicate the expected accuracy of the decided values made by the respective elements.

In another aspect of the present invention, a comparator compares the error sums, or mean-squared errors (MSE), calculated at the separate elements. And, a selector makes selection of the decided values at one of the decision-feedback detector elements to utilize as the detected values of the space-time block code.

Processing requirements needed to calculate the detected values are significantly less than the processing requirements needed by maximum-likelihood (ML), spherical detection (SD), or other conventional schemes by which to detect a space-time block code of data.

A selective decision-feedback detector (SDFD) operates to decode a space-time block code (STBC). For each code block, system matrices are formulated with the real and imaginary parts thereof decoupled. And, the channel matrix is Q-R factorized, i.e., each channel matrix is decomposed into Q and R components, an orthogonal matrix, and an upper triangular matrix, respectively. A hard decision is made for every half symbol, the real part and the imaginary part of a symbol, individually. That is to say, the component parts of the symbol are individually, rather than jointly, detected. Each decision result is fed back by way of a feedback path and is used in a subsequent decision until a solution candidate for all symbols is obtained. With different permutations of the channel matrix, more than one solution candidate is obtainable. A candidate that exhibits a minimum error is selected as the detector output. The operation of the selected decision-feedback detector with few candidates is much simpler than an optimum sphere detector and exhibits error performance very close to the optimum detector when applied to a special space time block code, which provides both diversity gain and spatial multiplexing gain. The selective decision-feedback detector is applicable to various additional STBC structures, e.g., layered space-time codes.

In these and other aspects, therefore, apparatus, and an associated method, is provided for detecting values of a block of symbols received at a radio communication station. A first decider is adapted to receive indications of the block of data symbols and of a first representation of channel conditions of channels upon which the block of data symbols is communicated. The first decider is configured to decide first-decided values of the block of data symbols. A second decider is adapted to receive indications of the block of data symbols and of a second representation of the channel conditions of the channels upon which the block of data symbols is communicated. The second decider is configured to decide second-decided values of the block of data symbols. A selector is configured to select one of the first decided values and the second decided values as detected values of the block of data symbols.

Referring first to FIG. 1, an MIMO (multiple-input, multiple-output) communication system, shown generally at 10, provides for communications between a set of communication stations. Here, communications are performed between a network station, a base transceiver station 12, and a mobile station 14 by way of communication channels 16 defined upon a radio air interface extending therebetween. The communication stations each include a plurality of antennas 18. The antennas 18 at the communication station that transmits data convert signal energy into electromagnetic form and provide the multiple inputs in the MIMO system. And, the antennas 18 at the communication station that receives data converts signal energy into electrical form and provide the multiple outputs of the MIMO system. The antennas, in one implementation, are of corresponding numbers at both communication stations. In other implementations, dissimilar numbers of antennas are positioned at the respective communication stations. Paths, i.e., channels, extend between each of the transmit antennas and each of the receive antennas of the communication stations. A channel matrix represents the channel conditions on each of such channels. In the exemplary implementation, the communication system forms a cellular radio communication system, such as a so-called, 4G ($4^{th}$ generation), MIMO-based cellular communication system. More generally, the communication stations 12 and 14 are representative of a sending and a receiving station of a generic MIMO communication arrangement. Accordingly, while the following description shall describe exemplary operation with respect to communications between the exemplary implementation of a network station 12 and a mobile station 14, such operation is analogous to that of a generic MIMO communication arrangement. And, while the following description shall describe downlink communications from the network station 12 to the mobile station 14. Uplink communications in the reverse direction are analogously describable.

The base transceiver station 12 forms a portion of a network part of the communication system. And, here, the base transceiver station (BTS) is coupled to a base station controller (BSC) 20 that, in turn, is coupled to a gateway (GWY) 22. The elements 12, 20, and 22, form part of a radio access network (RAN) 24.

The gateway forms a gateway between the radio access network and an external network, here a packet data network (PDN) 26, such as the Internet. The network 26 is coupled to a correspondent node (CN) 28 that forms an ultimate destination, or source, of communication data that is communicated between the communication stations 12 and 14.

As noted previously, the communication channels upon which data is communicated exhibit non-ideal characteristics. Exploiting the diversity increases the likelihood of its successful recovery. In an MIMO system, spatial diversity is exploited through the utilization of multiple transmit and receive antennas. Space-time block coding of data facilitates communication of coded data from multiple transmit antennas in manners that facilitates the successful communication of data over even non-ideal channels. Here, a space-time encoder 34 is representative of structure at a communication station, here the transmit part of the base transceiver station 12. Communicated data referred to herein as a space time block code is communicated upon multiple paths, i.e., channels, and detected at the receive part of the mobile station 14. The receive part of the mobile station is here shown to include an RF (radio frequency) part 38 that includes down-conversion elements, a demodulator 42, and apparatus 44 of an embodiment of the present invention. The apparatus 44 forms a selective decision-feedback detector that operates to form detected values on the line 46 of a received space-time block code. The receive part further shows a decoder 48 and an information sink 52, such as a user display or acoustic transducer.

While the structure and operation of an embodiment of the present invention is described with respect to down-link communications, i.e., communication of data from the network part to the mobile station, uplink communication of data is analogous. That is to say, a space-time block code of data, originated at the mobile station 14 is analogously communicated upon communication channels 16 for delivery and processing upon by the network part of the communication system. Here, the base transceiver station 12 also includes the apparatus 44 of an embodiment of the present invention. The receive part of the mobile station is here shown further to include a decoder 48 and an information sink 52, such as a display device or an acoustic transducer.

Figure 2:
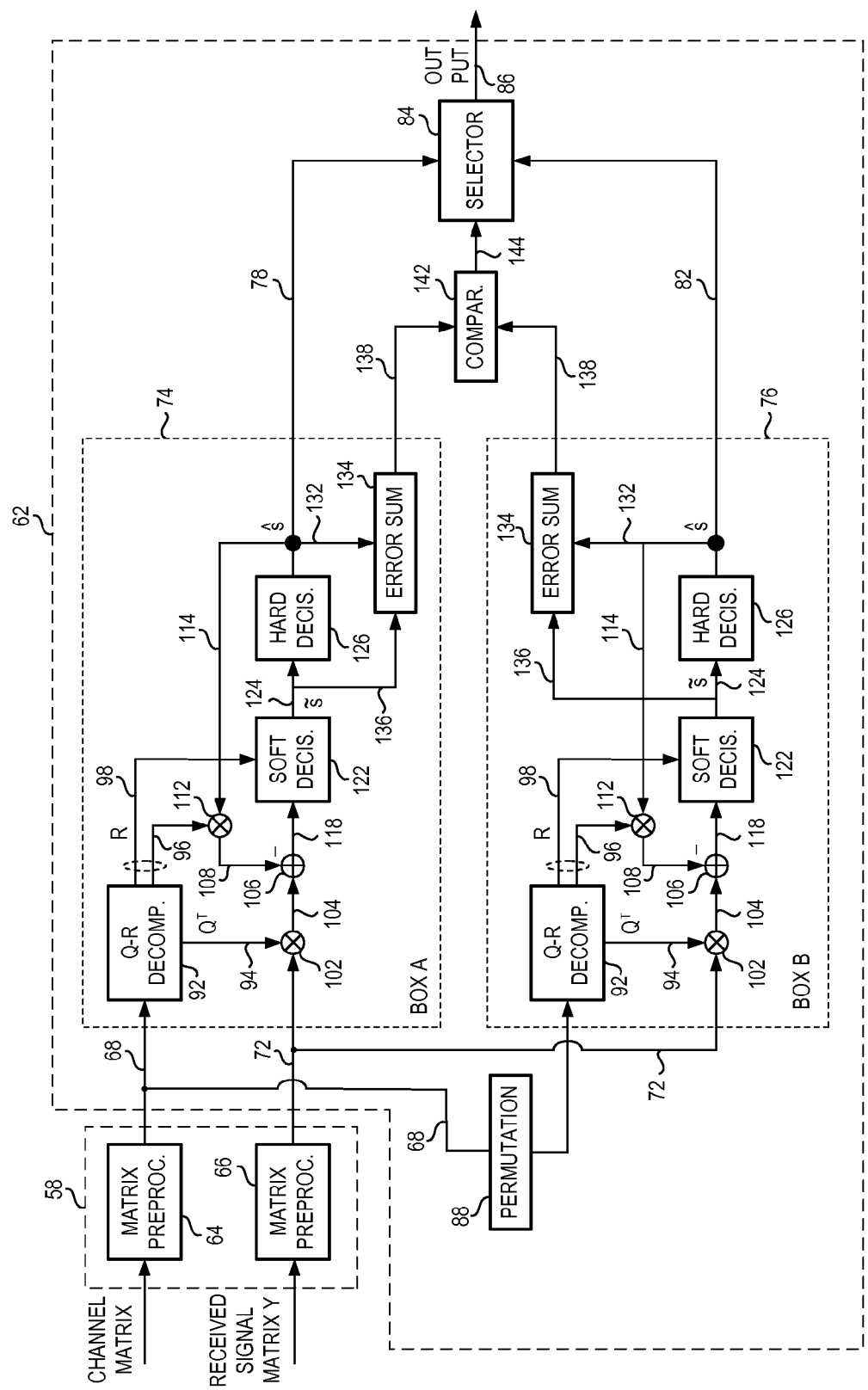
FIG. 2 illustrates a functional block diagram of a selective decision-feedback detector of an embodiment of the present invention that forms part of the communication system illustrated in FIG. 1.

FIG. 2 illustrates the apparatus 44 in greater detail. The apparatus is implemented in any desired manner, including, for instance, algorithms executable by processing circuitry or hardware equivalents thereof. Here, the apparatus is formed of two stages, a preprocessing stage 58 and a detector stage 62.

The matrix preprocessing stage includes elements 64 and 66 that are provided, respectively, with channel condition information and received signal information. The channel condition information comprises a channel matrix, and the received signal information comprises a received signal matrix Y. And, preprocessed representations are formed on the lines 68 and 72, respectively.

The stage 62 includes a first decider 74 and at least a second decider 76. Each decider forms a decision-feedback detector element. Decisions made by the respective deciders are provided by way of the lines 78 and 82, respectively, to a selector 84. The selector 84 selects the decided values of one of the elements 74 and 76 as the detected values of the space time block code as the detected values detected by the apparatus 44, here provided on the line 86 to additionally receive-part elements of the mobile station 14 (shown in FIG. 1) of which the apparatus 44 forms a portion. While the deciders 74 and 76 are illustrated as separate functional entities, in one implementation, the entities are formed of a single physical structure, with the functions of the separate entities performed at successive times.

The deciders 74 and 76 are identically constructed or otherwise operable as decision-feedback detectors to form decided values on the lines 78 and 82 respectively. The indication of the channel condition matrix, however, prior to application to the second decider is permutated by a permutated element 88. If the apparatus includes additional deciders, additional permutations of the preprocessed channel matrix and provided as inputs into the additional decider elements.

The decider 74 includes a Q-R matrix decomposer 92 that provides a decomposed matrix on the lines 94, 96, and 98.

The line 94 extends to a first input to a multiplier 102 that also receives at a second input, the representation of the received signal on the line 72. The multiplier forms a product signal on the line 104 that is provided to a subtractor 106. The subtractor receives on the line 108, a decomposition output generated on the line 96 multiplied with, by a multiplier 112 feedback information provided on the line 114. An output value is formed by the subtractor 106 on the line 118 that extends to a soft decider 122. The soft decider also receives the QR-decomposed information of the channel matrix on the line 98. The soft decider generates soft decided values on the line 124 that extends to a hard decider 126. The hard decider generates hard decisions on the line 78 and upon the feedback path 114. Hard decided values are further provided, by way of the line 132 to an error sum calculator 134. The soft decided values are also provided to the error sum calculator here by way of the line 136. Error sum calculations, or alternately MSE calculations, are performed and results are provided by way of the line 138 to a comparator 142.

The decider 76 includes corresponding elements, here commonly-referenced. And, a line 138 extending from the error sum calculator of the second decider also extends to the comparator. The comparator compares the values provided thereto and provides indications of the results of the comparisons on the line 144 that extends to the selector 84. Selection made by the selector is made responsive to the comparisons made by the comparator. When error sum calculations are calculated by the calculator, the selector selects the decided values of the decider that has the lowest calculated error sum.

Review of the elements of the apparatus 44 and the operations performed by the elements thereof indicate that only relatively straightforward operations are required to be performed. In contrast to use of a sphere detector or maximum likelihood detection schemes, the computational complexity required of the apparatus 48 is substantially reduced.

In the exemplary illustration of FIG. 1, the MIMO communication system 10 includes $N_T$ transmit antennas 18 and $N_R$ receive antennas 18. During each period of two time slots, a block of $N_T$ symbols, denoted as $s=[s_1\ s_2\ \ldots\ s_{NT}]^T$, are multiplexed and transmitted. The received signal over the two time slots can be expressed in general as:

$$Y = HS + N \qquad (1)$$

where S is the $N_T \times 2$ transmit signal matrix, with the element on the i-th row and j-th column representing the symbol transmitted from the i-th transmit antennas in the j-th time slot. $H=[h_{ij}]$ is the $N_R \times N_T$ channel matrix, with the element $h_{ij}$ on the i-th row and the j-th column representing the channel propagation coefficients from the j-th transmit antenna to the i-th receive antenna. A flat and slow Rayleigh fading channel is assumed, that is, each element of H is a zero-mean, i.i.d. complex Gaussian random variable of unit variance and constant over a block of two time slots but may change from block to block independently. N is an $N_R \times N_T$ matrix, with each element representing the zero-mean, i.i.d. additive white Gaussian noise (AWGN) with its two-sided power-spectral density (PSD) denoted by $N_0/2$. $Y=[y_{ij}]$ is the $N_R \times 2$ receive signal matrix, with $y_{ij}$ representing the signal received by the i-th receive antenna in the j-th time slot of the block. Perfect channel state information is assumed to be available only at the receiver.

In the two time slots, the block of $N_T$ symbols is split into $N_T/2$ groups. The two symbols of each group are organized as a block of the Alamouti space-time block code (ASTBC). That is, the code block for the k-th group is specified by the matrix:

$$S_k = \begin{bmatrix} s_{2k-1} & s_{2k}^* \\ s_{2k} & -s_{2k-1}^* \end{bmatrix}, k = 1, \ldots, N_T/2. \quad (2)$$

The signals on the first (or the second) row of $S_k$ are transmitted by the (2k−1)-th (or the 2k-th) transmit antenna, while the signals on the first (or, the second) column are transmitted in the first (or, the second) time slot. The transmit signal matrix S of the whole block in Eq. (1) is defined as:

$$S = [S_1^T S_2^T \ldots S_{N_T/2}^T]^T. \quad (3)$$

In other words, the whole code block can be viewed as $NT/2$ ASTBC code blocks cascaded in the spatial dimension. For instance, with four transmit antennas, $$S = \begin{bmatrix} s_1 & s_2^* \\ s_2 & -s_1^* \\ s_3 & s_4^* \\ s_4 & -s_3^* \end{bmatrix}. \quad (4)$$

With $N_T$ symbols being transmitted in parallel during two time slots, and each symbol being transmitted twice from two different antennas, the MIMO system provides both diversity and spatial multiplexing with an integer coding rate $R_c = N_T/2$. On the other hand, because each symbol is transmitted twice, the energy for each symbol transmitted in a time slot is assumed to be reduced by half, so that the total symbol energy is kept unchanged from a single transmit antenna system.

The received signal for each time slot is a linear combination of $N_T$ symbols. In order to separate the mixed signals in the receiver, a two-step linear detection scheme has been proposed. The first step is to separate the $N_T/2$ groups using a group detector. Then, the second step is applied to decode the ASTBC of each group individually using a linear decoder typical for Alamouti code. Methods are available by which to implement the group detector based on the minimum mean square error (MMSE) algorithm, zero-force (ZF) algorithm, and QR decomposition respectively.

And, a sphere decoder (SD) is available to decode the code blocks. SD performs the optimal maximum-likelihood (ML) detection with simpler computing complexity. However, in spite of its optimal error performance, the SD is still much more complex compared with aforementioned linear detection schemes.

The proposing stage 58 of the apparatus 48 is represented mathematically. Then, substituting Eq. (3) into (1) Y is represented as:

$$Y = \begin{bmatrix} y_{1,1} & y_{1,2} \\ \ldots & \\ y_{N_R,1} & y_{N_R,2} \end{bmatrix} = \begin{bmatrix} h_{1,1} & \ldots & h_{1,N_T} \\ \ldots & & \\ h_{N_R,1} & \ldots & h_{N_R,N_T} \end{bmatrix} \cdot \begin{bmatrix} s_1 & s_2^* \\ s_2 & -s_1^* \\ \ldots & \ldots \\ s_{N_T-1} & s_{N_T}^* \\ s_{N_T} & -s_{N_T-1}^* \end{bmatrix} + N. \quad (5)$$

By concatenating the rows of Y in one after another and then transposing the result into a column vector, the system can be re-formulated as $$y'' = H''s + n'' \quad (6)$$

where s is the first column of S, $$y'' = [y_{1,1}, y_{1,2}^* \ldots y_{N_R,1}, y_{N_R,2}^*]^T, \quad (7)$$

and $$H'' = [h_1^T h_2^T \ldots h_{N_R}^T]^T, \quad (8)$$

with $$h_k = \begin{bmatrix} \overline{h}_{k,1} \\ \overline{h}_{k,2} \end{bmatrix}, \quad k = 1, 2, \ldots, N_R, \quad (9)$$

where $\overline{h}_{k,1}$ is the k-th row of H, and $$\overline{h}_{k,2} = [-\overline{h}_{k,1}^*(2) \overline{h}_{k,1}^*(1) \ldots -\overline{h}_{k,1}^*(2N_T) \overline{h}_{k,1}^*(2N_T-1)] \quad (10)$$

for k=1, ... $N_R$, where $\overline{h}_{k,1}(i)$ is the i-th element of $\overline{h}_{k,1}$. As a complex vector, the real and imaginary parts of y'' can be separated by decoupling the M-ary QAM constellation into two $\sqrt{M}$-ary-amplitude-shift-keying (ASK) constellations, yielding $$y' = H's' + n', \quad (11)$$

where $$y' = [\Re\{y''\}^T \Im\{y''\}^T]^T, \quad (12)$$

$$s' = [\Re\{s\}^T \Im\{s\}^T]^T, \quad (13)$$

and $$H' = \begin{bmatrix} \Re\{H''\} & -\Im\{H''\} \\ \Im\{H''\} & \Re\{H''\} \end{bmatrix}. \quad (14)$$

Assuming rank (H')=$2N_T$, H' can be factorized by the Q-R decomposition. Substituting H'=QR into (11), y is represented as:

$$y = Rs' + n, \quad (15)$$

where $$y = Q^T y' \quad (16)$$

is a column vector of 2NT real numbers, R is a $2N_T \times 2N_T$ upper triangular matrix, and $n = Q^T n'$ has the same statistics as n'.

Since R in Eq. (15) is an upper triangular matrix, for each element of $s'_i$, in a sequence starting from $i=N_T$, we can obtain the soft-valued decision statistics (denoted by $\tilde{s}'_i$) are represented as:

$$\tilde{s}'_i = \begin{cases} y_i/r_{i,i} & \text{for } i = N_T \\ \left(y_i - \sum_{j=i}^{N_T} r_{i,j} \hat{s}'_j\right)/r_{i,i} & \text{for } i < N_T \end{cases} \quad (17)$$

Where $r_{i,j}$ is the element of R on the i-th row and j-th column and $\hat{s}'_i$ is the hard decision made on $\tilde{s}'_i$ immediately after $\tilde{s}'_i$ is obtained from Eq. (17). This decision is immediately fed-back to Eq. (17) to calculate for $\tilde{s}'_{i-1}$. This continues until all $\tilde{s}'_i$ are obtained for i=$2N_T$, $2N_{T-1}$, ... 2, 1. Here, each decision is made for half of a symbol and is used as a potential candidate of the output. The quality of the decision can be indicated by the mean-squared error (MSE), defined as:

$$d' = \frac{1}{N_T}\sum_{i=1}^{N_T}|\tilde{s}'_i - \tilde{s}'_i|^2, \quad (18)$$

or equivalently, by the simple error-sum (ES), defined as:

$$\Lambda' = \sum_{i=1}^{N_T}|\tilde{s}'_i - \hat{s}'_i|. \quad (19)$$

The decision of $\hat{s}'=[\hat{s}'_i]$ can be used as the solution for the final detector output. However, improved performance can be obtained if more QR decompositions are performed on permutated versions of H'. In general, any permutation of H' is valid. A simple way to obtain a second candidate starts from reversing the column order of H'. That is, we define a left-right mirror of H' and an up-down mirror of s' as:

$${}^\prime H=[h'_{N_T} h'_{N_T-1} \ldots h'_2 h'_1] \quad (20)$$

and $${}^\prime s=[s'_{N_T} s'_{N_T-1} \ldots s'_2 s'_1]^T. \quad (21)$$

Where $h'_k$ is the k-th column of H' and s' the k-th element of s'. By performing QR decomposition, $'H = 'Q'R$, we obtain $${}^\prime y = {}^\prime R\, {}^\prime s + {}^\prime n, \quad (22)$$

where:

$${}^\prime y = {}^\prime Q^T y'. \quad (23)$$

Again, 'R is an upper triangular matrix, but 's is an upper-side down version of s'. Following the same calculation of Eq. (17), a second candidate for s', denoted by $'\hat{s}$, is obtained (but this time $'\hat{s}_1$ is computed first and $'\hat{s}_{N_T}$ last). By comparing the two ESs (or MSEs), the $\hat{s}'$ or $'\hat{s}$ with minimum ES (or MSE) is then selected as the final decoding output, that is, $$\hat{s}' = \begin{cases} \hat{s}' & \text{if } \Lambda' < {}^\prime\Lambda, \text{ (or } d' < {}^\prime d) \\ {}^\prime\hat{s} & \text{otherwise} \end{cases}, \quad (24)$$

where $'\Lambda$ and $'d$ are the ES and MSE associated with $'\hat{s}$. Finally, the detector output is $$\hat{s} = [\hat{s}'_1 \hat{s}'_2 \ldots \hat{s}'_{N_T}]^T + j[\hat{s}'_{N_T+1} \hat{s}'_{N_T+2} \ldots \hat{s}'_{2N_T}]^T. \quad (25)$$

In summary, the detector 48 performs the following operations:
(1) Derive H' from H according to Eq. (8)~(10) and (14);
(2) Decompose H' to obtain Q and R;
(3) Derive y from Y according to Eq. (7), (12) and (16);
(4) Compute $\tilde{s}'$ according to Eq. (17). Its hard-decision version $\hat{s}'$ is obtained at the same time. Calculate ES according to Eq. (19);
(5) Reverse the column order of H' to get 'H. Perform QR decomposition to get 'Q and 'R. Obtain 'y using Eq. (23);
(6) With 'R and 'y, use the method similar to Step (4) to obtain $'\hat{s}$ and the ES. Reverse the element order of $'\hat{s}$.
(7) Choose $\hat{s}'$ or $'\hat{s}$ according to Eq. (24);
(8) Generate the detector output according to Eq. (25).

Figure 3:
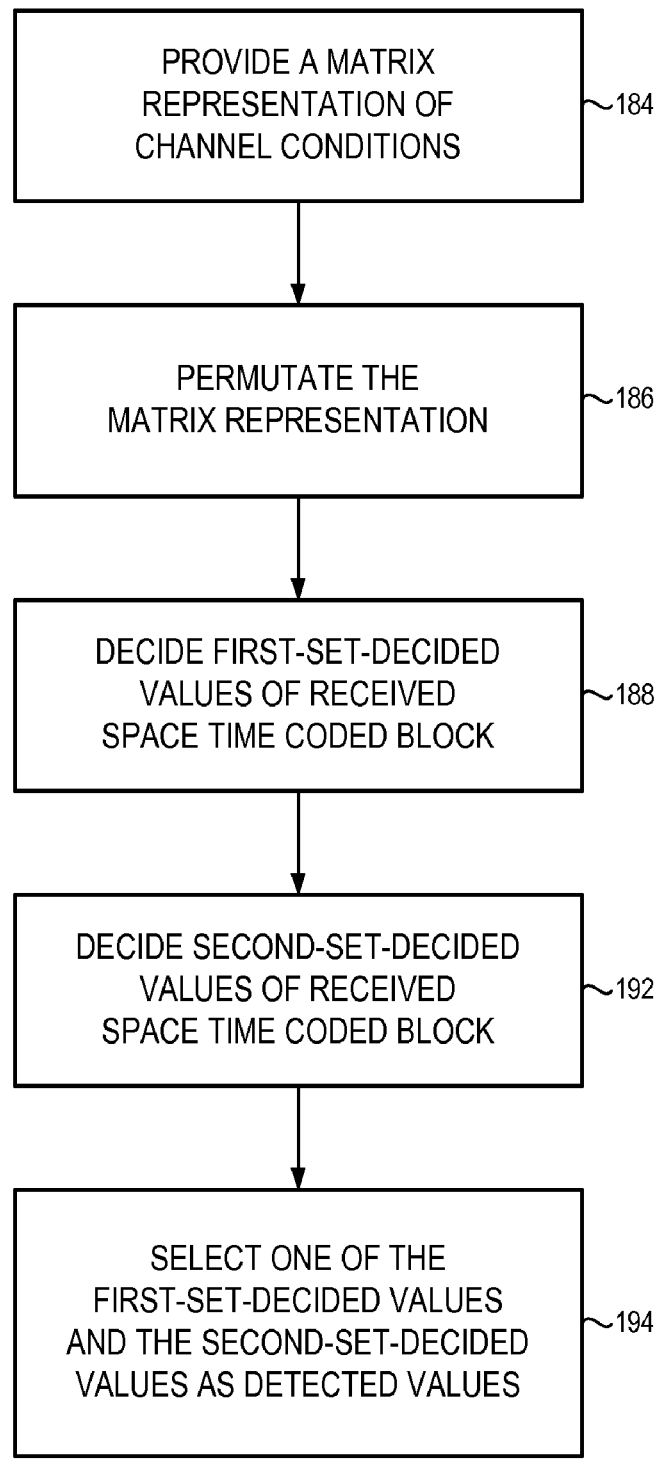
FIG. 3 illustrates a method flow diagram representative of the method of operation of an embodiment of the present invention.

FIG. 3 illustrates a method flow diagram, shown generally at 182, representative of the method of operation of an embodiment of the present invention. The method detects values of a block of data symbols received at a radio-communication station.

First, and as indicated by the block 184, a matrix representation of the channel conditions upon which a space-time coded block is communicated to a receiving station is provided. Then, and as indicated by the block 186, the matrix representation is permutated.

Then, and as indicated by the block 188, first-set-decided values of the block of data symbols are decided responsive to indications of the block of data symbols received at the radio communication station. And a first representation of channel conditions of the channels upon which the block of data symbols is communicated. And, as indicated by the block 192, second-set-decided values of the block of data symbols are decided responsive to the indications of the block of data symbols received at the radio communication station and a second representation, the permutated channel matrix, of the channel conditions of the channels upon which the block of data symbols is communicated. Then, and as indicated by the block 194, one of the first-set-decided values and the second-set-decided values are selected as the detected values of the block of data symbols.

By simple permutation of a channel matrix, different, decided values of the space-time block code are made. Selection is made from amongst the separately decided values as the detected values to be used for further processing. A lowered-complexity manner by which to detect, using selective decision feedback detection, a received block of space-time coded data is thereby made.

What is claimed is:

1. Apparatus for detecting a block of data symbols received at a communication station, said apparatus comprising:
   a decider for receiving a signal matrix representation of the block of data symbols, a channel matrix representation of channel conditions, and a permutation of the channel matrix representation, and for providing a first decision output of the received block and a first error calculation of the first decision output, and for providing a second decision output of the received block and a second error calculation of the second decision output;
   wherein:
   the first decision output is a first hard decision value formed in response to a first soft decision value, the first soft decision value formed in response to the received signal matrix representation and a first decomposed matrix of the channel matrix representation;
   the second decision output is a second hard decision value formed in response to a second soft decision value, the second soft decision value formed in response to the received signal matrix representation and of a first decomposed matrix of the permutated channel matrix representation; and
   a selector for selecting either the first decision output or the second decision output in response to a comparison of the first error calculation and the second error calculation.

2. The apparatus of claim 1 wherein said decider further comprises a Q-R matrix decomposer for generating the first decomposed matrix for each of the channel matrix and the permutated channel matrix representation.

3. The apparatus of claim 2 further comprising a soft decision decider for receiving a feedback controlled representation of the signal matrix representation and the first decomposed matrix for each of the channel matrix and the permutated channel matrix representation from said Q-R matrix decomposer and in response forming the first soft decision value and the second soft decision value.

4. The apparatus of claim 3 wherein the feedback controlled representation of the signal matrix representation is further defined as a first product of the signal matrix representation and a second decomposed matrix, generated by the Q-R matrix decomposer for the channel matrix representation, and the subtraction of a second product of the first hard decision value and a third decomposed matrix, generated from the Q-R matrix decomposer for channel matrix representation, from the first product.

5. The apparatus of claim 3 wherein the feedback controlled representation of the signal matrix representation is further defined as a first product of the signal matrix representation and a second decomposed matrix, generated by the Q-R matrix decomposer for the permutation of the channel matrix representation, and the subtraction of a second product of the second hard decision value and a third decomposed matrix, generated from the Q-R matrix decomposer for the permutation of the channel matrix representation, from the first product.

6. The apparatus of claim 1 further comprising a hard decision decider for receiving the first and second soft decision value and providing the first and second hard decision value.

7. The apparatus of claim 1 wherein the first error calculation is a calculated result of the first soft decision value and the first hard decision value.

8. The apparatus of claim 1 wherein the second error calculation is a calculated result of the second soft decision value and the second hard decision value.

9. The apparatus of claim 1 further comprises a comparator for receiving and comparing the first and second error value and providing a result to said selector.

10. The apparatus of claim 1 further comprising an error sum calculator for receiving the first and second hard decision value and the first and second soft decision value and for providing the first and second error calculation to said selector.

11. The apparatus of claim 1 further comprising a preprocessing stage for providing the signal matrix representation and the channel matrix representation to said decider.

12. A detector for detecting symbol values of a space time block code received at a communication station, said detector comprising:
a decision-feedback decider configured for receiving a preprocessed signal matrix, a preprocessed channel matrix, and a permutation of the preprocessed channel matrix, and for forming a first decision output and a first error calculation, the first error calculation formed in response to the first decision output, and for forming a second decision output and a second error calculation, the second error calculation formed in response to the second decision output;
wherein:
the first decision output is a first hard decision value formed in response to a first soft decision value, the first soft decision value formed in response to the received preprocessed signal matrix and a first decomposed matrix of the preprocessed channel matrix;
the second decision output is a second hard decision value formed in response to a second soft decision value, the second soft decision value formed in response to the received preprocessed signal matrix and of a first decomposed matrix of the permutation of the preprocessed channel matrix; and
a selector configured to select the first decision output or the second decision output in response to relation between the first error calculation and the second error calculation.

13. A method for detecting a block of data symbols received at a Radio Frequency (RF) receiving part of a communication station, said method comprising:
deciding at the RF receive part a first output of the received block of data symbols and a first error calculation of the first output, the first output is a first hard decision value formed in response to a first soft decision value, the first soft decision value formed in response to a received signal matrix representation and a first decomposed matrix of a matrix representation of channel conditions;
deciding a second decision output and a second error calculation of the second decision output, the second decision output is a second hard decision value of a second soft decision value input, the second soft decision value formed in response to a received signal matrix representation and a first decomposed matrix of a permutated matrix representation of channel conditions; and
selecting either the first decision output or the second decision output in response to a comparison of the first error calculation and the second error calculation.

14. The method of claim 13 further comprises generating the first decomposed matrix for each of the channel matrix and the permutated channel matrix representation.

15. The method of claim 14 further comprises receiving a feedback controlled representation of the signal matrix representation and the first decomposed matrix for each of the matrix representation of channel conditions and the permutated matrix representation of channel conditions and in response forming the first soft decision value and the second soft decision value.

16. The method of claim 15 wherein feedback controlled representation of the signal matrix representation is further defined as a first product of the signal matrix representation and a second decomposed matrix, generated by the Q-R matrix decomposer for the channel matrix representation, and the subtraction of a second product of the first hard decision value and a third decomposed matrix, generated from the Q-R matrix decomposer for channel matrix representation, from the first product.

17. The method of claim 15 wherein the feedback controlled representation of the signal matrix representation is further defined as a first product of the signal matrix representation and a second decomposed matrix, generated by the Q-R matrix decomposer for the permutation of the channel matrix representation, and the subtraction of a second product of the second hard decision value and a third decomposed matrix, generated from the Q-R matrix decomposer for the permutation of the channel matrix representation, from the first product.

18. The method of claim 12 wherein the first error calculation is a calculated result of the first soft decision value and the first hard decision value.

19. The method of claim 12 wherein the second error calculation is a calculated result of the second soft decision value and the second hard decision value.

20. The method of claim 12 further comprises comparing the first and second error value and providing a result for selection.

* * * * *